US005988566A

United States Patent [19]

Meyer

[11] Patent Number: 5,988,566

[45] Date of Patent: Nov. 23, 1999

[54] AIRCRAFT WINDOW CONSTRUCTION

[75] Inventor: Juergen Meyer, Hamburg, Germany

[73] Assignee: DaimlerChrysler Aerospace Airbus GmbH, Hamburg, Germany

[21] Appl. No.: 08/985,093

[22] Filed: Dec. 4, 1997

[30] Foreign Application Priority Data

Dec. 5, 1996 [DE] Germany .......................... 196 50 416

[51] Int. Cl.[6] ........................................ B64C 1/14

[52] U.S. Cl. ........................................ 244/129.3; 49/504

[58] Field of Search .......................... 244/129.3; 49/504, 49/471; 454/81, 82, 156, 198; 417/540

[56] References Cited

U.S. PATENT DOCUMENTS

| | | |
|---|---|---|
| 2,189,388 | 2/1940 | Zand . |
| 2,302,740 | 11/1942 | Boicey . |
| 2,474,512 | 6/1949 | Bechtold et al. . |
| 2,575,757 | 11/1951 | Hardy . |
| 3,452,553 | 7/1969 | Dershin et al. . |
| 4,931,000 | 6/1990 | Fleming . |
| 4,932,608 | 6/1990 | Heidish et al. . |
| 5,199,856 | 4/1993 | Epstein et al. . |

FOREIGN PATENT DOCUMENTS

| | | | |
|---|---|---|---|
| 0322776 | 7/1989 | European Pat. Off. . | |
| 1057059 | 3/1952 | France | 244/129.3 |
| 693159 | 6/1940 | Germany . | |
| 737294 | 6/1943 | Germany . | |
| 933371 | 8/1955 | Germany . | |
| 23321 | 6/1962 | Germany . | |
| 1252533 | 10/1967 | Germany . | |
| 2225368 | 5/1990 | United Kingdom | 244/129.3 |

*Primary Examiner*—Charles T. Jordan
*Assistant Examiner*—Tien Dinh
*Attorney, Agent, or Firm*—W. F. Fasse; W. G. Fasse

[57] ABSTRACT

A window for an aircraft cabin has a first pane (3) with a high fatigue strength on the inside facing the cabin and a second pane (4) with a lower fatigue strength smaller than the first fatigue strength on the outside facing the atmosphere. The space (3A) between the window panes (3, 4) is sealed but connected through a pipe to an air pressure controller responsive to the atmospheric pressure. The pressure controller may be an air pump (12) or variable volume chambers (19, 20) for keeping the pressure in the space between the panes at the prevailing atmospheric pressure without actually venting the space to the atmosphere.

9 Claims, 2 Drawing Sheets

AIRCRAFT WINDOW CONSTRUCTION

PRIORITY CLAIM

This application is based on and claims the priority under 35 U.S.C. §119 of German Patent Application 196 50 416.3, filed on Dec. 5, 1996. The entire disclosure of German Patent Application 196 50 416.3 is incorporated herein by reference.

FIELD OF THE INVENTION

The invention relates to a construction of aircraft windows for an aircraft cabin, particularly in passenger aircraft.

BACKGROUND INFORMATION

Aircraft windows must satisfy several requirements. Once such requirement is a clear visibility from the cabin to the outside. Further, the window structure must be capable of maintaining the static pressure inside The cabin even at high altitudes. Window components are not supposed go protrude outside the outer skin surface of the aircraft body in order to avoid an adverse influence of the window construction on the aerodynamic characteristics of the outer aircraft skin to avoid any increase in the drag caused by the window construction.

Conventional aircraft windows comprise two window panes for an increased reliability. One of these window panes, namely the outside main pane, is relatively thick and has a high fatigue strength achieved for example by making the thick window pane of stretched acrylic glass. The other window pane is relatively thin and has a small fatigue strength. Such thin window panes are made of stretched acrylic glass. Such thin aircraft window panes are referred to as auxiliary panes. Conventionally, the thick or main window pane is installed As an outer window pane in a window frame away from the cabin while the thin auxiliary pane is installed ac an inner pane next to the cabin. The construction is conventionally such that the strong outer window pane takes up the cabin interior pressure in normal operating condition. The inner auxiliary pane is not required to take up the inner cabin pressure under normal operating conditions since the cabin pressure is effective between the inner and outer window panes. Both panes are held in a window frame by an elastic sealing profile that holds both panes in the frame as a structural, nodular unit which is inserted into the window frame and secured in the frame which in turn is secured to the aircraft body structure.

As mentioned, the space between the panes is conventionally connected to the interior of the cabin through a small diameter bore so as to provide a pressure equalization between the space between the panes and the interior of the cabin. It the exterior main pane should break, it is necessary that the auxiliary pane takes up the entire anterior cabin pressure. However, in such an emergency it is only necessary to assure that the particular flight can continue to its destination without a total failure of the inner window pane. On the other hand, the main window pane must be capable of taking up the inner cabin pressure under all operating conditions, including normal operating conditions. As a result, the main pane has a tendency to bulge outwardly, whereby the stretching of the material facilitates the adverse effects of external harmful materials such as corrosives becoming effective on the outer window surface. The effects of corrosives and the like aided by the outward bulging of the main window pane are thus very disadvantageous, especially with regard to the useful service life of the main window panes which are rather expensive and must be frequently replaced when they no longer permit a clear visibility to the outside. Moreover, the outward bulging of the main window panes in conventional aircraft windows adversely affects the aerodynamic drag, thereby increasing the drag. Another disadvantage is seen in that the connection of the space between the panes to the cabin facilitates fogging of the window panes when moist air enters into the space between the panes so that the visibility through the window is impaired.

German Patent 693,159 (Wagner et al.), published on Jun. 6, 1940 discloses a self-supporting transparent nose cone shell structure of an aircraft. A transparent, strength providing inner wall (2) of the nose cone carries a plurality of radially outwardly extending ribs (18) circumferentially distributed around the nose cone for carrying an outer transparent wall skin (3). The space between the two transparent walls (2) and (3) is heated to prevent fogging of the nose cone.

German Patent 737,294 (Diez et al.), published on Jun. 3, 1943 discloses an aircraft cabin window with a stronger outer window pane (1) and a thinner inner window pane (2). The space (4) between the window panes is sealed by a seal (3) and an air cleaner device is positioned to reach into the inner space. The air cleaner device holds, for example active charcoal or silica gel.

German Patent 933,371 (GÖtz), published on Aug. 25, 1955 discloses a dryer cartridge for an aircraft window that is inserted through the thinner inner window pane into the space between the inner pane (9) and the outer stronger pane (10). A tablet (3) of air drying material is inserted into the cartridge which is also equipped with a rubber membrane that responds to a pressure difference between the pressure in the space between the panes and the cabin pressure. The cartridge is exchangeable.

German Patent Publication 1,252,533 (Hertel), published on Oct. 19, 1967 discloses aircraft cabin windows that have a common frame structure which in turn forms part of the aircraft body structure. A strong inner pane (6) and a smooth outer covering (9) enclose a space (3). The outer covering (9) is supposed to reduce aerodynamic drag.

East German Patent Publication 23,321 (Riedel et al.), published on Jun. 29, 1962 discloses a double window for pressure chambers, especially aircraft cabins in which in addition to the regular window frame that spaces the stronger inner window pane (4) from the thin outer window pane (7), a further frame (8) is provided which holds a foam rubber seal (13).

The just described prior art leaves room for improvement, especially with regard to the arrangement of the window panes and with regard to the control of the air pressure in the space between the window panes.

OBJECTS OF THE INVENTION

In view of the above it is the aim of the invention to achieve the following objects singly or in combination:

- to improve the construction of an aircraft cabin window in such a way that it has a prolonged service life and any stretching of the window panes does not adversely affect the aerodynamic characteristics of the outer aircraft body skin;
- to make sure that an outer window pane will not stretch outside the confines or contour of the outer aircraft body skin;
- to eliminate the fogging and/or contamination of the window panes especially inside surfaces thereof facing each other across a space between the panes; and to substantially reduce the need for replacing aircraft window panes by avoiding or at least reducing contamination and damage to the panes.

SUMMARY OF THE INVENTION

The above objects have been achieved according to the invention in an aircraft window construction for a pressurizable aircraft cabin. The construction is characterized by a window frame holding a main inner window pane having a first fatigue strength and an auxiliary outer window pane having a second fatigue strength smaller than the first fatigue strength. The auxiliary weaker window pane is held int the window frame outwardly spaced from the main inner window pane to form a space enclosed between the inner and outer window panes. Further, a pressure control device such as an air pump or a variable volume chamber is connected through a pressure control inlet to the space between the panes for controlling the pressure in that space to correspond to the atmospheric pressure. However, the space between the panes is not connected to the outside atmosphere.

An important advantage of the invention in seen in the increased service life of the present window structure especially of the main window pane on the inside toward the cabin which position protects the main pane against adverse influences outside the aircraft body. Due the pressure equalization of the pressure inside the space between the panes with the atmospheric pressure, the weaker outer pane does not bulge outwardly, thereby avoiding adverse drag increasing influences. Another advantage is seen in that fogging and contaminations of the window panes by dirt and the like is avoided particularly on the pane surfaces facing each other across the enclosed space.

BRIEF DESCRIPTION OF THE DRAWINGS

In order that the invention may be clearly understood, it will now be described, in connection with an example embodiment of the invention with reference to the drawings, wherein.

DETAILED DESCRIPTION OF PREFERRED EXAMPLE EMBODIMENTS AND OF THE BEST MODE OF THE INVENTION

Figure 3:
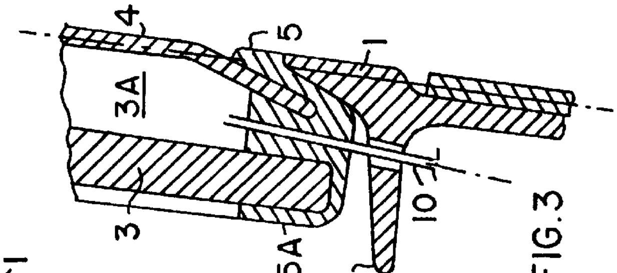
FIG. 3 is sectional enlarged view showing the detail III of FIG. 2.
Figure 2:
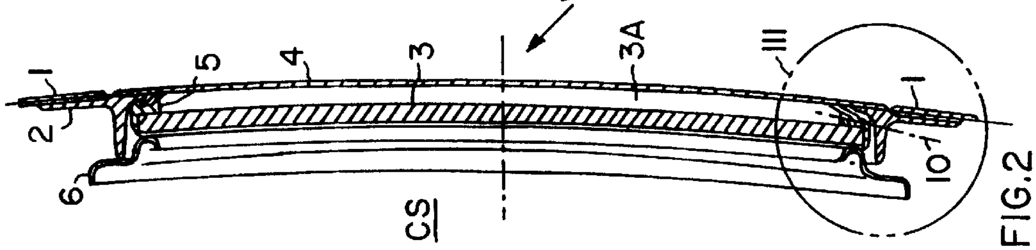
FIG. 2 is a sectional view along section line II—II in FIG. 1.
Figure 1:
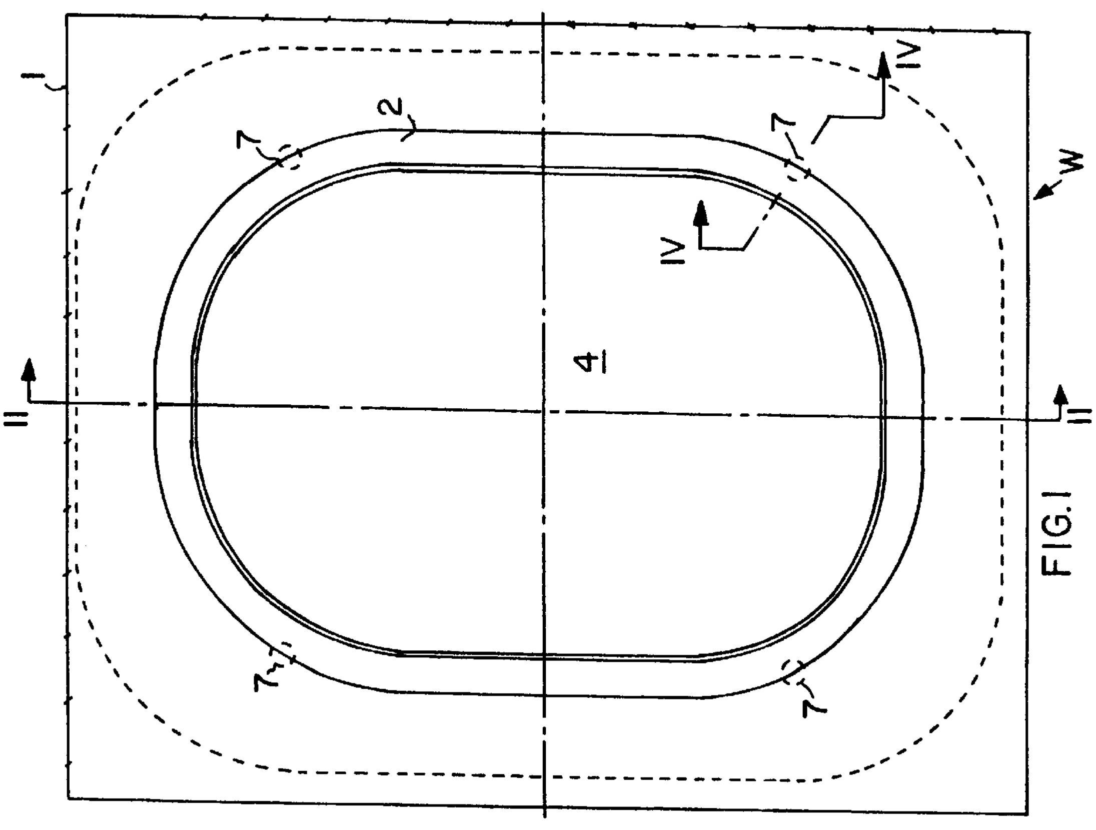
FIG. 1 is a plan view of an aircraft cabin window to show the section planes for FIGS. 2 and 4.

FIGS. 1, 2, and 3 show a cabin window W held in place in an opening in an aircraft body enclosed by an outer skin 1. A window frame 2 provides the required rigid connection between the window W and the aircraft body frame. A main inner pane 3 leaving a high fatigue strength is mounted in the frame 2 closer to the cabin space CS than a secondary or auxiliary outer window pane 4 having a fatigue strength smaller than the first fatigue strength of the inner pane 3. The two panes 3 and 4 are spaced from each other by a seal 5 to enclose a space 3A. The just mentioned components form a modular structural unit secured in the frame 2 by a clamping frame 6 held in place, for example in four positions by screw connections 7. According to the invention the main and stronger pane 3 functions as an inner pane while the auxiliary weaker pane 4 functions as an outer pane, whereby both panes are constructed accordingly, for example of stretched acrylic glass the inside pane and hardened mineral glass for the weaker outside pane. Further, according to the invention the pressure in the space 3A between the panes 3, 4 is controlled by a pressure control device 12 so 16 to be described in more detail below with reference to FIGS. 5 and 6. These devices 12 or 16 equalize the pressure in the space 3A with the external atmospheric pressure surrounding the aircraft on the ground and in flight. However, the space 3A is not directly vented to the atmosphere outside the aircraft cabin.

Figure 5:
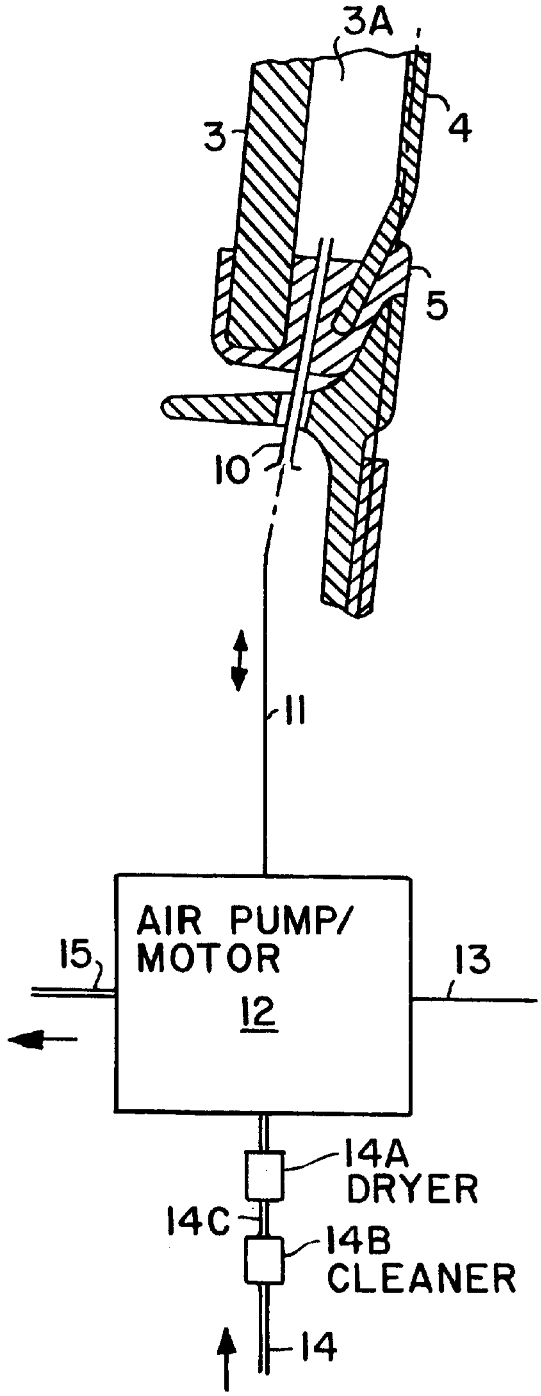
FIG. 5 is a view similar to FIG. 3, but further including a pressure control device.
Figure 6:
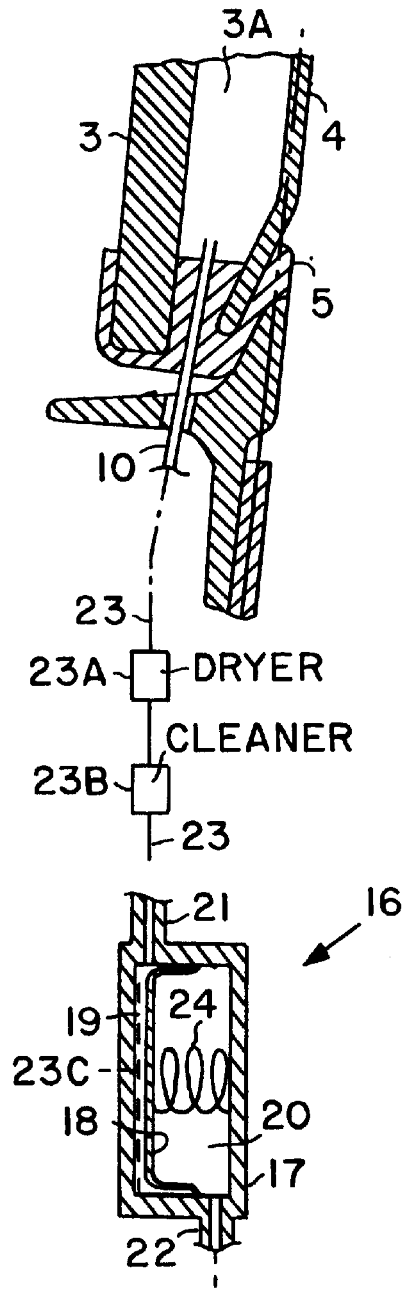
FIG. 6 is a view similar to that of FIG. 3 supplemented by a variable volume chamber for the pressure control in the space between the window panes.

FIG. 3 shows, on an enlarged scale, the detail III of FIG. 2 illustrating how the sealing profile 5 holds the two window panes 3 and 4 in the frame 2. A pressure control inlet 10 to the space 3A passes through the sealing profile 5 and, if necessary, also through the window frame 2 for connecting the space 3A with a pressure control device 12 or 16 as shown in FIGS. 5 and 6 for equalizing the air pressure in the space 3A to the prevailing external atmospheric pressure. The pressure control inlet 10 is convenient and may be part of an air conduit directly connecting the pressure control 12, 16 to the space 3A.

Figure 4:
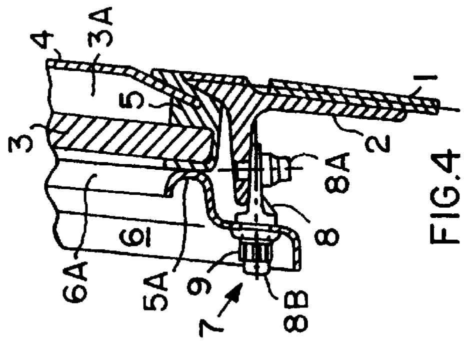
FIG. 4 is a sectional view along section line IV—IV in FIG. 1.

FIG. 4 is a section along section line IV—IV in FIG. 1 and shows one of, for example, four connectors 7 that hold the window frame 2 and the fixing or clamping frame 6 together. A bracket 8 is secured by a rivet 8A to the window frame 2. An outer end 8B of the bracket 8 is provided with a threading for clamping the frame 6 with a bulge or rim 6A against a flange 5A of the seal 5 and thus against the inner window pane 3. A nut 9 on the threaded end 8B of the bracket 8 permits tightening the clamping frame 6 against the window pane to hold the window structure in place in the frame 2 which in turn is conventionally secured to the aircraft body.

When an aircraft is on an ascending flight, the pressure inside the cabin rises relative to the atmospheric pressure outside the aircraft until the cabin pressure reaches its maximum value at cruising altitude. According to the invention the air pressure in the space 3A between the window panes 3 and 4 is equalized through the pressure control inlet 10 with the prevailing outside atmospheric pressure, whereby the following advantages are achieved. First, the same atmospheric pressure prevails on both sides of the weaker outer window pane 4 so that it does not tend to bulge outwardly, whereby adverse influences on the aerodynamic characteristics of the aircraft body are prevented. Second, due to the absence of such bulging the outer window pane 4 though weaker in its fatigue strength than the inner pane 3, is surprisingly resistant against any aggressive media such as corrosives particles, and the like that can be effective on the outside of the window pane 4. Third, the outer window pane 4 protects the inner window pane 3 against any effects of harmful substances. Fourth, the cleaning of the air introduced into the space 3A protects both pane surfaces facing into the space 3A against contamination. Yet another advantage of the invention is seen in that the useful or service life of the window panes, especially the inner window pane 4 is extended to correspond even to the service life of the aircraft itself, thereby substantially reducing or eliminating the need for replacing damaged window panes.

FIG. 5 shows that the space 3A of the window of FIG. 3 is connected through the pressure control inlet 10 and through an air conduit 11 to a pressure controller 12, for example in the four of an air pump driven by an electric motor. The motor is connected through electrical conductors 13 to a source of electrical powers not shown. The pressure control device 12 makes sure that the pressure inside the space 3A between the pane 3 and 4 is maintained at the external atmospheric pressure at all times. For this purpose the device 12 pumps air out of the space 3A when the pressure in the space 3A rises relative to the atmospheric pressure around the aircraft, for example during ascending flight. Air removed in this way from the space 3A is discharged through an air discharge port 15 into the cabin. On the other hand, on a descending flight, for example, the device 12 makes sure that air is replenished in the space 3A through an inlet port 14 connected through a duct 14C to the air pump in the device 12. In this way the outer pane 4 is protected against bulging outwardly and against bulging inwardly. The pressure control device 12 as such is conventional and is, for example manufactured as a proportional closed loop air pressure control by the firm JOUCOMATIC GmbH in D-75248 Ölbronn-Dürrn, Federal Republic of Germany. Such devices are sold by the just mentioned company under the trade name "SENTRONIC".

FIG. 5 further shows that the air supplied into the space 3A is treated by cleaning and drying prior to entering the space 3A. For this purpose a dryer, dryer 14A is provided in the duct 14C. Additionally, the incoming air is cleaned by a cleaner 14B also installed in the duct 14C. The desiccate or drying agent in the dryer 14A may be provided in the form of a cartridge. The air dryer makes sure that both surfaces of the panes 3 and 4 facing each other will not fog up and stay clean. Instead of a cartridge, an air drying air permeable membrane may be provided, such membrane dryers are on the market under the tradename "DRYPOINT" sold by the firm BeKo Condensate-Technology GmbH of D-41468 Neuss, Federal Republic of Germany. The air cleaner 14B may, for example, be a so-called conventional micro-air filter. The cleaning of the air makes sure that the window pane surfaces facing each other and the space 3A will not be contaminated by extraneous matter.

FIG. 6 shows the same window construction as in FIG. 5, however the control of the air pressure in the space 3A is accomplished by a variable volume pressure controller 16 rather than by a pressure control device 12. The controller 16 has a housing 17 divided by a flexible membrane 18 biased by a spring 24. The flexible membrane 18 divides the inner volume of the housing 17 into two sections 19 and 20. These volume sections 19 and 20 are variable depending on the instantaneous position of the membrane 18. However, the sum of the volumes is constant. The chamber section 19 has a port or nipple 21 connected through an air conduit 23 to the pressure control inlet 10 or the air duct 23 may lead directly into the space 3A. The chamber section 20 has another nipple or outlet port 22 connected to the atmosphere. An air dryer 23A and an air cleaner 232B are provided in the air duct 23 for treating the pressure control air similarly to the dryer and cleaner described in connection with FIG. 5, An air dryer 23C shown by a dashed line in the chamber section 19 may be used instead of the air dryer 23A or in addition thereto.

In operation, the membrane 18 will respond to the atmospheric pressure to which the membrane side facing the chamber section 20 is exposed through the inlet port 22. As shown, the aircraft is on the ground and the chamber section 19 has assumed its smallest volume while the chamber section 20 has assumed its largest volume. As the outside atmospheric pressure is reduced when an aircraft increases its altitude, the atmospheric pressure in the space 3A is correspondingly reduced, whereby air flows out of the chamber 20 through the port 22. As a result, the membrane 18 must follow the new pressure balance and will assume a position that reduces the volume of the chamber section 20 while increasing the volume of the chamber section 19. As mentioned, the membrane 18 is biased by a spring 24 which makes stare that on the ground the membrane 18 assumes the position shown in FIG. 6. The membrane 18 with its flexibility and the biasing spring 24 are so dimensioned that the pressure prevailing in the space 3A between the window panes 3 and 4 will substantially correspond to the atmospheric pressure at all times on the ground and in flight.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft cabin window construction for a pressurizable aircraft cabin, said window construction comprising a window frame (2), a main inner window pane (3) held in said frame next to said cabin, said inner window pane having a first fatigue strength for taking up all operational loads, an auxiliary outer window pane (4) having a second fatigue strength smaller than said first fatigue strength, wherein said second outer window pane (4) is mounted in said window frame (2) outwardly spaced from said main inner window pane (3) to enclose a space (3A) between said inner and outer window panes (3 and 4), a seal (5) positioned between said window frame (2) and said inner and outer panes for sealing said space (3A) against said pressurized aircraft cabin and against the atmosphere outside said aircraft cabin, a pressure control device (12, 16), an air conduit (10, 11) connecting said pressure control device to said space (3A) between said inner and outer window panes (3, 4) for maintaining external atmospheric pressure inside said space (3A) and a pressure differential across said outer window pane (4) is avoided to relieve said outer window pane (4) with said smaller fatigue strength of all stress that could be caused by such pressure differential, and air treatment means connected to said pressure control device (12, 16) for maintaining said external atmospheric pressure in said space (3A) with clean and dry air.

2. The aircraft cabin window construction of claim 1, wherein said pressure control device (12) comprises an air pump and an electric motor connected to said air pump for driving said air pump, said air pump having an air inlet port (14), an air discharge port (15), and wherein said air conduit (10, 11) connects said space (3A) to said pump.

3. The aircraft cabin window construction of claim 2, wherein said air pump of said pressure control device (12) comprises an inlet duct (14C) connected to said air inlet port (14), and an air dryer (14A) in said inlet duct (14C) for feeding dried air into said space (3A) through said air conduit (10, 11).

4. The aircraft cabin window construction of claim 2, wherein said air pump comprises an inlet duct (14C) connected to said inlet port (14), and an air cleaner (14B) in said inlet duct (14C) for feeding clean air into said space (3A).

5. The aircraft cabin window construction of claim 1, wherein said pressure control device (16) comprises a housing (17), a flexible membrane (18) in said housing dividing said housing into a first chamber (19) connected to said venting pipe and a second chamber (20) connected to the external atmosphere for maintaining the pressure in said space (3A) between said inner and outer window panes (3, 4) at the prevailing atmospheric pressure outside an aircraft.

6. The aircraft cabin window construction of claim 5, further comprising an air duct (23) connecting said space (3A) with said first chamber (19), said second chamber (20) having a venting port (22) connected to the atmosphere, and means (23A) positioned for drying air passing through said air duct (23).

7. The aircraft cabin window construction of claim 5, further comprising an air duct (23) connecting said space (3A) with said first chamber (19), said second chamber (20) having a venting port (22) connected to the atmosphere, and means (23C) for drying air in said first chamber (19).

8. The aircraft cabin window construction of claim 5, further comprising an air duct (23) connecting said space (3A) with said first chamber (19), said second chamber (20) having a venting port (22) connected to the atmosphere and means (23B) for cleaning air passing through said air duct (23).

9. The aircraft cabin window construction of claim 1, wherein said air conduit passes through said seal (5).

* * * * *

UNITED STATES PATENT AND TRADEMARK OFFICE

CERTIFICATE OF CORRECTION

PATENT NO. : 5,988,566

DATED : Nov. 23, 1999

INVENTOR(S) : Juergen Meyer

It is certified that error appears in the above-indentified patent and that said Letters Patent is hereby corrected as shown below:

Col. 1, line 20, after "inside" replace "The" by --the--; line 36, after "installed" replace "As" by --as--; line 40, after "interior" replace "pressure in normal" by --pressure under a normal--;

Col. 3, line 62, after "3" replace "leaving" by --having--;

Col. 4, line 51, after "bulging" insert --,--; line 52, after "4" insert --,--;

Col. 5, line 32, after "be" replace "provided, such" by --provided. Such--; line 54, after "cleaner" replace "232B" by --23B--; line 67, before "pressure" delete "atmospheric";

Col. 6, line 7, after "makes" replace "stare" by --sure--; line 61, after "(3A)" insert --through said air conduit (10,11)--;

Signed and Sealed this

Third Day of April, 2001

*Attest:*

Nicholas P. Godici

NICHOLAS P. GODICI

*Attesting Officer* *Acting Director of the United States Patent and Trademark Office*